United States Patent [19]

Woodason et al.

[11] Patent Number: 5,517,852

[45] Date of Patent: May 21, 1996

[54] DIAGNOSTIC PERFORMANCE TESTING FOR GAS TURBINE ENGINES

[75] Inventors: Raymond O. Woodason; David W. Shaw, both of Winnipeg, Canada

[73] Assignee: Standard Aero Limited, Winnipeg, Canada

[21] Appl. No.: 333,255

[22] Filed: Nov. 2, 1994

[51] Int. Cl.$^6$ .................................................. G01M 15/00
[52] U.S. Cl. ..................... 73/117.4; 73/118.2; 73/861.79
[58] Field of Search .................................... 73/116, 117.4, 73/115, 118.2, 170.15, 861.42, 861.64, 861.71, 861.79; 415/118

[56] References Cited

U.S. PATENT DOCUMENTS

| | | | |
|---|---|---|---|
| 2,981,058 | 4/1961 | Reed | 73/116 |
| 3,258,958 | 7/1966 | Bosch et al. | |
| 3,310,666 | 3/1967 | Millar et al. | |
| 3,338,050 | 8/1967 | Ferrel et al. | |
| 3,343,417 | 9/1967 | Peek, Jr. | 73/116 |
| 3,538,760 | 11/1970 | Atkey et al. | 73/117.4 |
| 3,834,222 | 9/1974 | McDonald | 73/117.4 |
| 3,835,701 | 9/1974 | Murphy et al. | |
| 3,852,958 | 12/1974 | Adams et al. | 73/116 |
| 3,868,625 | 2/1975 | Speigner et al. | 73/116 |
| 3,899,878 | 8/1975 | Lompton et al. | 73/116 |
| 3,927,307 | 12/1975 | Reschak | |
| 3,935,558 | 1/1976 | Miller et al. | 73/116 |
| 4,003,249 | 1/1977 | Laskody | |
| 4,005,572 | 2/1977 | Giffhorn | 60/39.28 R |
| 4,055,994 | 11/1977 | Roslyng et al. | 73/116 |
| 4,258,545 | 3/1981 | Slater | |
| 4,414,807 | 11/1983 | Kerr | |
| 4,434,664 | 3/1984 | Antonazzi | |
| 4,523,603 | 6/1985 | Peikert | |
| 4,580,910 | 4/1986 | Corwin | 73/116 |
| 4,598,581 | 7/1986 | Brekke | |
| 4,608,860 | 9/1986 | Charrier et al. | 73/116 |
| 4,744,670 | 5/1988 | Janssen | |
| 4,833,911 | 5/1989 | Zeeban et al. | |
| 5,072,580 | 12/1991 | Patterson et al. | |
| 5,165,845 | 11/1992 | Khalid | |
| 5,383,355 | 1/1995 | Baleras et al. | 73/117.4 |

*Primary Examiner*—Richard Chilcot
*Assistant Examiner*—Eric S. McCall
*Attorney, Agent, or Firm*—Lundberg, Woessner Schwegman

[57] ABSTRACT

An improved gas turbine engine diagnostic system is disclosed which is particularly adapted for direct measurement of compressor performance, including efficiency and mass flow, for aircraft engines, without having to remove the engine form the aircraft. The system includes an instrumented compressor air discharge tube which has probes for total pressure, static pressure and temperature. The instrumented air discharge tube may be substituted for an existing air discharge tube for the engine to be tested, without having to remove the engine. Transducers attached to these probes provide signals which are connected to a data recorder or computer. Data can be taken as the engine is run, either on ground test or flight test. The total mass airflow output from the compressor stage for various engine performance settings can then be calculated using the static pressure, total pressure and air temperature measurements. At the completion of the test, the instrumented air tube can be removed and the original one replaced.

9 Claims, 5 Drawing Sheets

DIAGNOSTIC PERFORMANCE TESTING FOR GAS TURBINE ENGINES

TECHNICAL FIELD

This invention relates to systems for testing of gas turbine engines, to determine if performance is up to established specifications, and if not, to help determine the source of performance problems. In particular, the invention includes techniques and apparatus for testing mass airflow output from the compressor of a gas turbine engine without having to remove the engine from the aircraft. The invention is particularly adapted for field-testing of helicopter engines.

BACKGROUND OF THE INVENTION

Gas turbine engines may be subject to reduced performance at some point in their service lives. There may be many causes for this reduced performance, including engine component wear, accessory faults, or internal instrumentation errors. When gas turbine engines are used in aircraft, any occurrence of reduced performance must be promptly diagnosed and corrected, before the aircraft can be returned to service. However, the engine performance instrumentation provided on the aircraft, while adequate for flight management proposes, is generally incapable of providing sufficient information to diagnose some types of performance problems. One problem is that the aircraft instrumentation does not measure all the types of data needed to pinpoint the source of the problem; another problem may be that the aircraft instrumentation is itself in error. This lack of sufficient reliable data to pinpoint the problem often results in guessing at the needed corrective action, and may involve expensive removal of modules or the entire engine, to determine the problem. Incorrect guesses at corrective action can lead to added expenses in the process of eventually finding and correcting the problem.

Various systems or devices have been proposed in the prior art to improve on this situation. Such prior art systems often involve data recorder or computer packages to work with various sensors for attachment to the aircraft engine, with connections and transducers to monitor engine parameters such as speed, torque, turbine temperature, as well as fuel, oil and electrical parameters. Some also measure pressure and temperature at the compressor intake and discharge so that compressor efficiency can be calculated. Such systems usually accomplish this by measuring static pressure and temperature through any available port at the compressor discharge. However, this is insufficient information to calculate mass air flow since one also needs to know the station total pressure and the cross-sectional flow area to some accuracy. It will therefore be appreciated that, such prior art systems do not provide direct measurement of gas path data, but only provide an indirect indication thereof by tracking the other parameters over time, from which one may be able to infer insufficient mass flow.

Of course it is known in the field of gas turbine design and development to provide instrumentation to measure mass airflow, as well as many other parameters, as an aid in the development testing of new engines. This type of testing often involves elaborate and expensive testing facilities and specially instrumented prototypes which are very useful in the engine development environment, but which are impractical in the field.

SUMMARY OF THE INVENTION

To overcome these and other problems, the present invention provides an improved gas turbine engine diagnostic system, which is capable of measuring mass airflow output from the compressor stage of the engine, and which may be field-installed, without requiring removal of the engine.

The system includes a compressor air discharge tube instrumented with probes for total pressure, static pressure and temperature. The instrumented air discharge tube may be substituted for an existing air discharge tube for the engine to be tested, without having to remove the engine. Transducers attached to these provide signals which are connected to a data recorder or computer. These signals are sampled or recorded as the engine is run, either on ground test or flight test. The total mass airflow output from the compressor stage for various engine performance settings can then be calculated using the static pressure, total pressure and air temperature measurements. At the completion of the test, the instrumented air tube can be removed and the original one replaced, again without having to remove the engine, unless, of course, if the tests indicate that the engine must be removed for work.

DETAILED DESCRIPTION OF THE INVENTION

Figure 1:
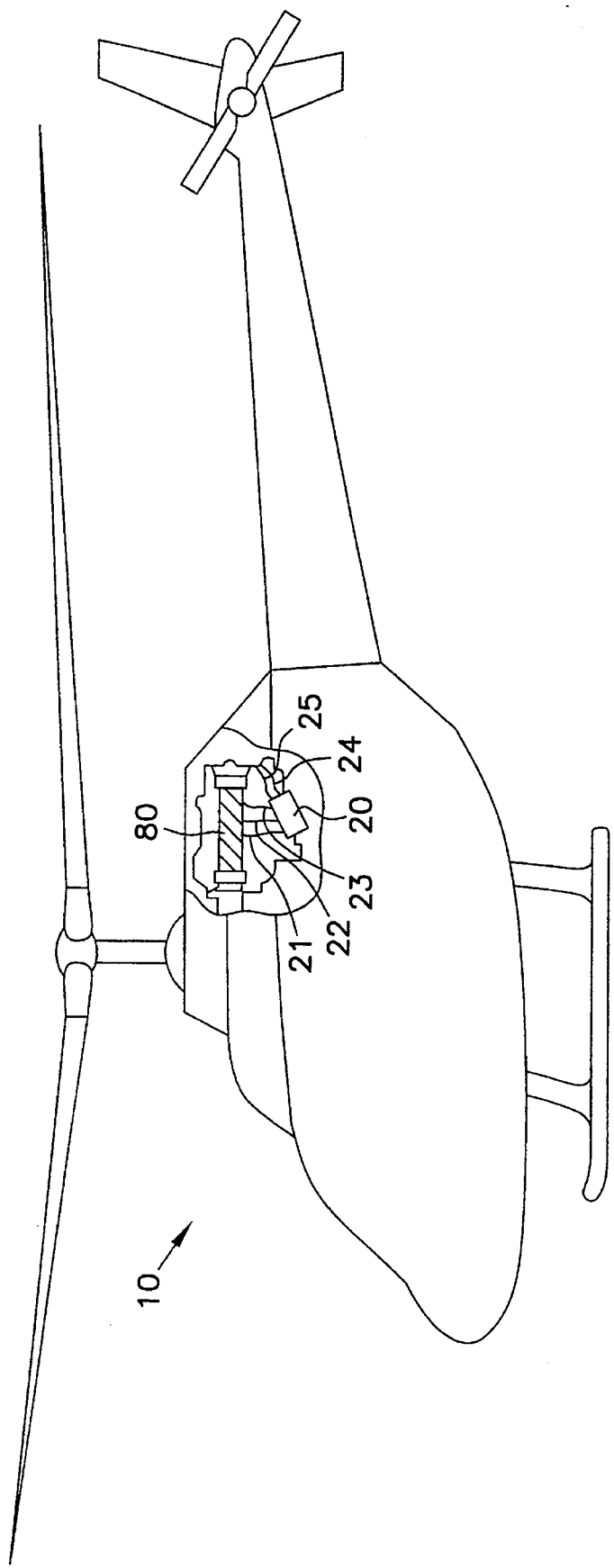
FIG. 1 is a diagrammatic representation of the use of the system of the present invention in the testing of a gas turbine in a helicopter.

In FIG. 1, reference number 10 generally designates a helicopter which is powered by a gas turbine engine. The engine is not shown in FIG. 1, but a portion of the helicopter representation is broken away to show the compressor output air discharge tube 80. As is described in greater detail below, instrumentation probes have been added to tube 80, and connections 21, 22 and 23 connect therefrom to a data recorder/computer 20. Inputs 24 and 25 are for connection of data to recorder/computer 20 from other types of data sensors, such as for speed, torque, electrical and fuel parameters, and the like. Since these types of parameter measurements are generally known in prior art engine diagnostic systems, they will not be described in detail here. Any number of such parameters can be monitored and input to the recorder/computer 20 as desired; and as the main feature of this invention resides in the mass airflow measurement system, only that will be described in detail.

The general procedure for testing using the invention is to mount the instrumented air discharge tube 80 on the aircraft engine, as described in detail below, to mount recorder/computer 20 in the aircraft, and to attach it to the various sensors. Data can then be recorded or sampled while running the engine, either on ground, or in flight. The data can then be analyzed to determine if engine performance is up to published specifications, or analyzed to determine which sub-system is the cause of substandard performance. As mentioned, an accurate measurement of mass airflow from the output of the compressor is needed, and the present invention provides a direct measurement thereof.

Figure 2:
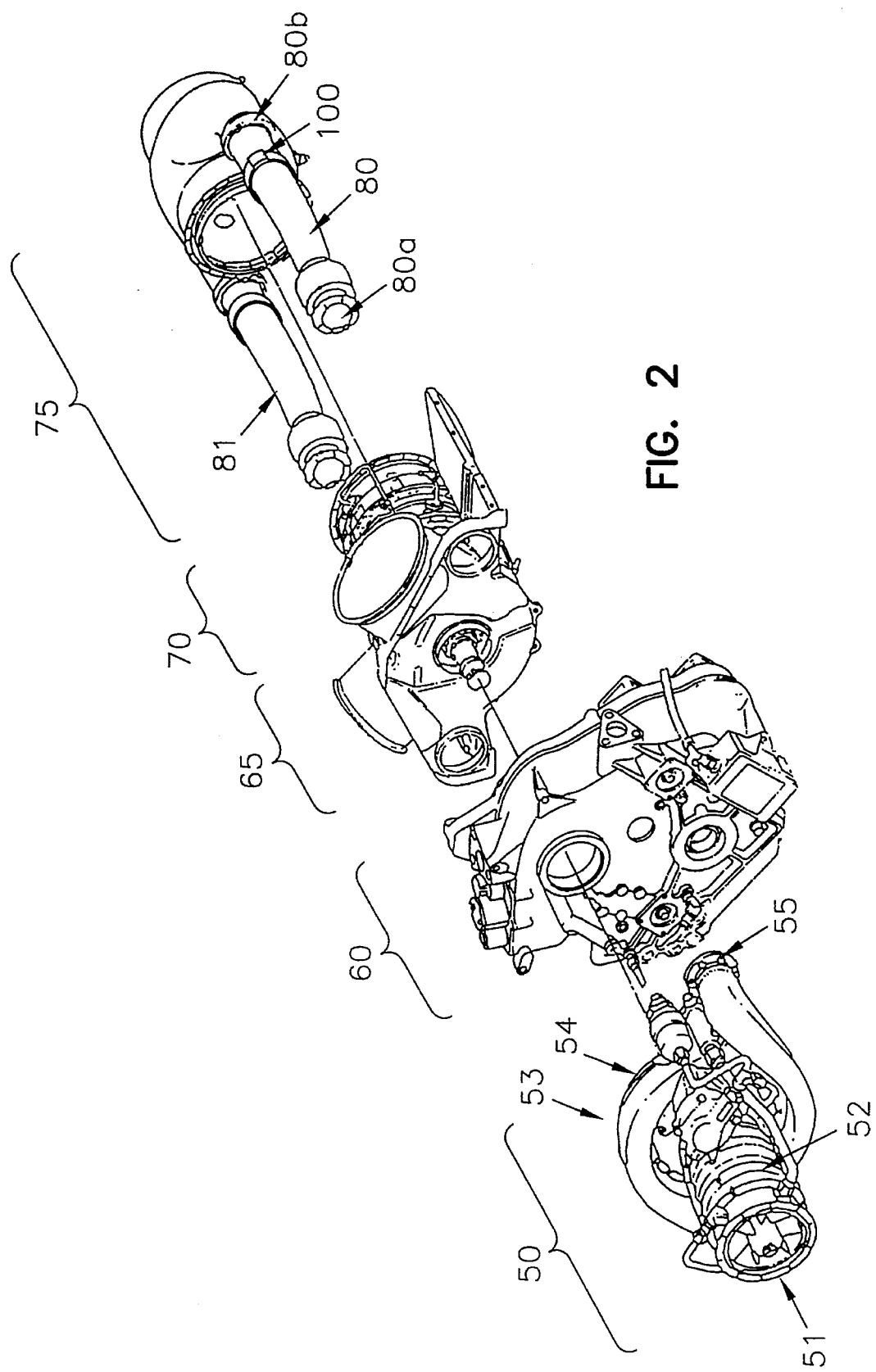
FIG. 2 is an exploded view of the engine of the helicopter of FIG. 1, illustrating the placement of sensors for total and static pressure and temperature in the compressor discharge.

FIG. 2 is a view of an Allison 250 gas turbine engine, which is one of the types of engines with which the preferred embodiment of the invention can be used. In FIG. 2 the main sub-assemblies of the engine are shown in partial exploded view. Reference number 50 is the compressor section of the engine. It includes an air inlet indicated by flow arrow 51, a number of axial compressor stages in the area indicated by reference number 52, and a final centrifugal compressor stage in the area indicated by reference number 53. The diffuser scroll 54 collects the compressed air and delivers it through ducts 55. There are two such ducts, one of which is visible in FIG. 2; the other one is hidden on the other side of the stage in the view shown.

The gearbox of the engine is indicated by reference number 60. In assembly, gearbox 60 is positioned between compressor stage 50 and the exhaust assembly 65. Next to exhaust assembly 65 is turbine section 70, and at the right-hand side of the drawing, combustion section 75. A pair of compressor discharge ducts 80, 81 are provided as part of the engine to carry compressed air to the combustion section 75. Specifically, in assembly, duct 55 fits over the end 80a of duct 80. The other end 80b fits within and is held in place by a flange portion of the housing of combustion section 75. Duct 81 on the opposite side of the engine serves the same purpose, for the other duct not shown, which is similar to 55 on the opposite side of the engine. In operation, compressed air from compressor 50 passes through ducts 80, 81, to the back of the engine, where it reverses direction to flow through the combustion section 75, turbine 70 to the exhaust 65.

Figure 3:
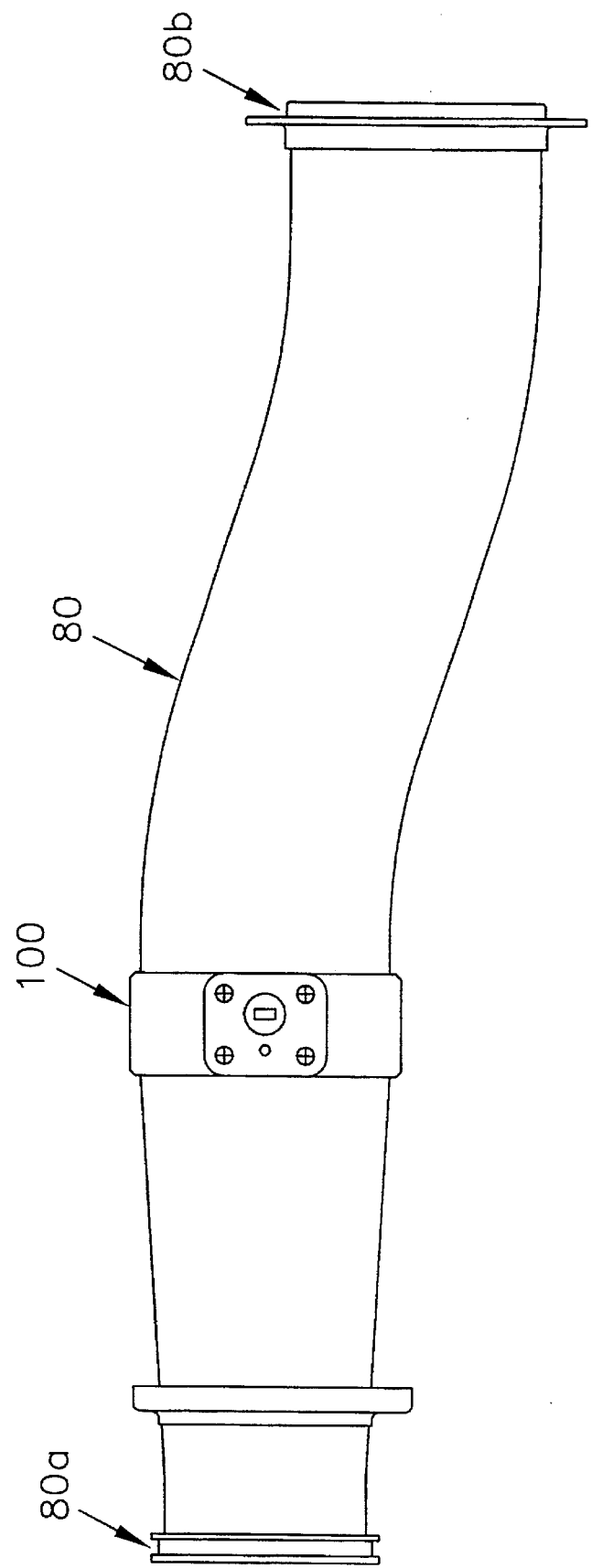
FIG. 3 is a view of the instrumented air tube, showing the pressure probes and temperature sensor assembly mounted thereon according to the present invention.
Figure 5:
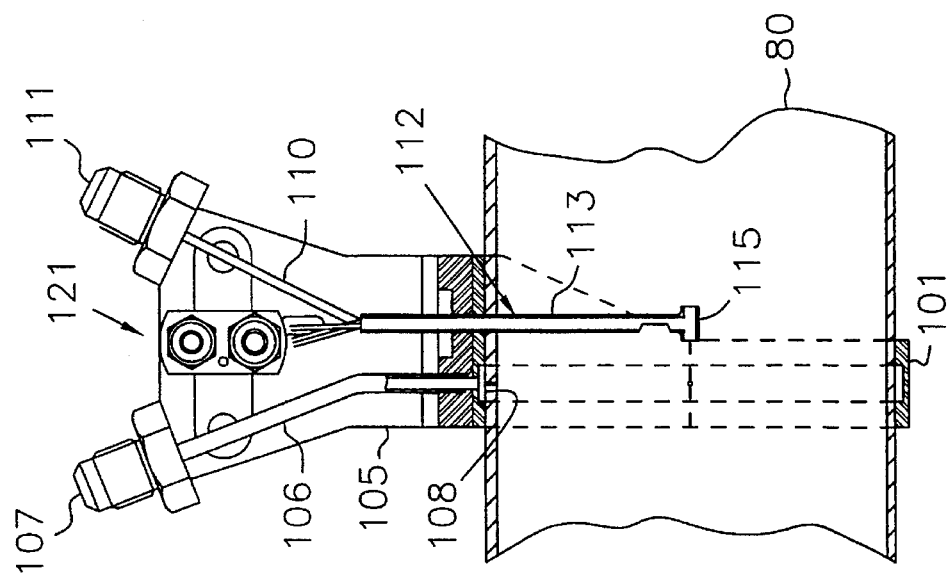
FIG. 5 is a side sectional view of the probe assembly of FIG. 4.
Figure 4:
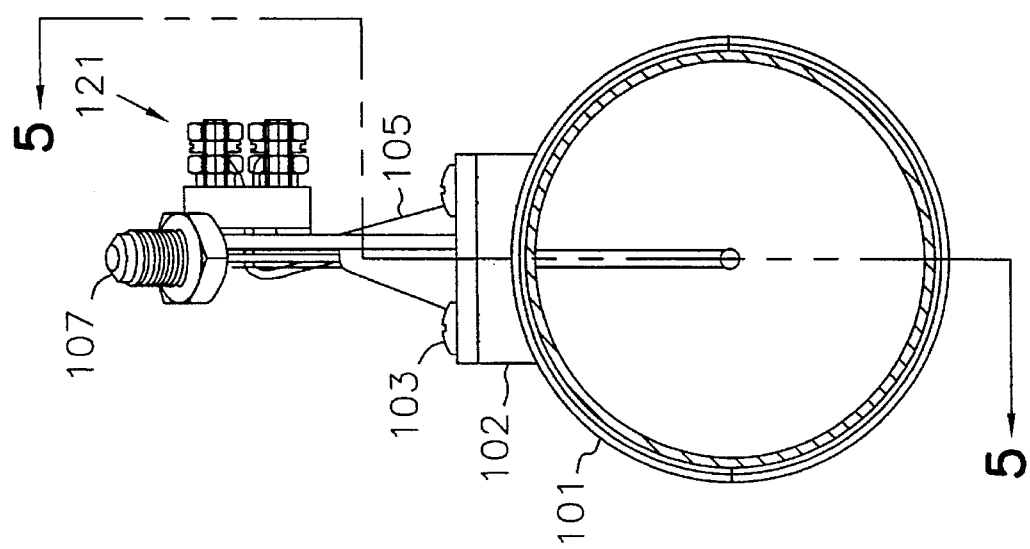
FIG. 4 is a front sectional view of the probe assembly.

In FIG. 2, the duct 80 is specially instrumented according to the present invention, and includes probe assembly 100, which is shown in greater detail in FIGS. 3–5.

The duct 80 of the engine does not normally include any instrumentation probe. In the implementation of the present invention, a special compressor discharge duct is used. It is preferably made from a standard compressor discharge duct so that it fully conforms to the design and specifications therefor, but it has been modified to include the probe assembly of the invention.

This is shown at larger scale in FIG. 3, where compressor discharge duct 80 is shown having ends 80a and 80b, with probe assembly 100 mounted thereon. As previously mentioned, the instrumented duct 80 is made by modification to a regular production compressor discharge duct obtained as a spare part. Once modified, the instrumented duct can be used as part of the testing kit, by installing it on each engine to be tested, then removing it when finished.

A plurality of holes are formed in the wall of duct 80 for probe assembly 100. As seen in FIG. 5, probe assembly 100 includes an annular shaped static pressure manifold 101 which fits in sealed relationship around duct 80 over six evenly spaced static pressure holes (not shown) which are provided in duct 80. Support bracket 105 for the probe assembly is mounted on static pressure manifold 101 by attachment block 102 and bolts 103. Support bracket 105 has a first port or passage 106 formed therein which connects at one end to a pressure fitting 107. The other end of passage 106 communicates through static port 108 to the static pressure manifold 101. In this way the static pressure in discharge duct 80 is communicated to pressure fitting 107 via passage 106, static port 108 and static manifold 101.

Support bracket 105 has a second port or passage 110 formed therein which is in communication with probe 112 extending through another hole formed in the duct 80, as seen in FIG. 5. Probe 112 is called a Kiel probe, and provides both the total pressure and thermocouple functions.

Figure 6:
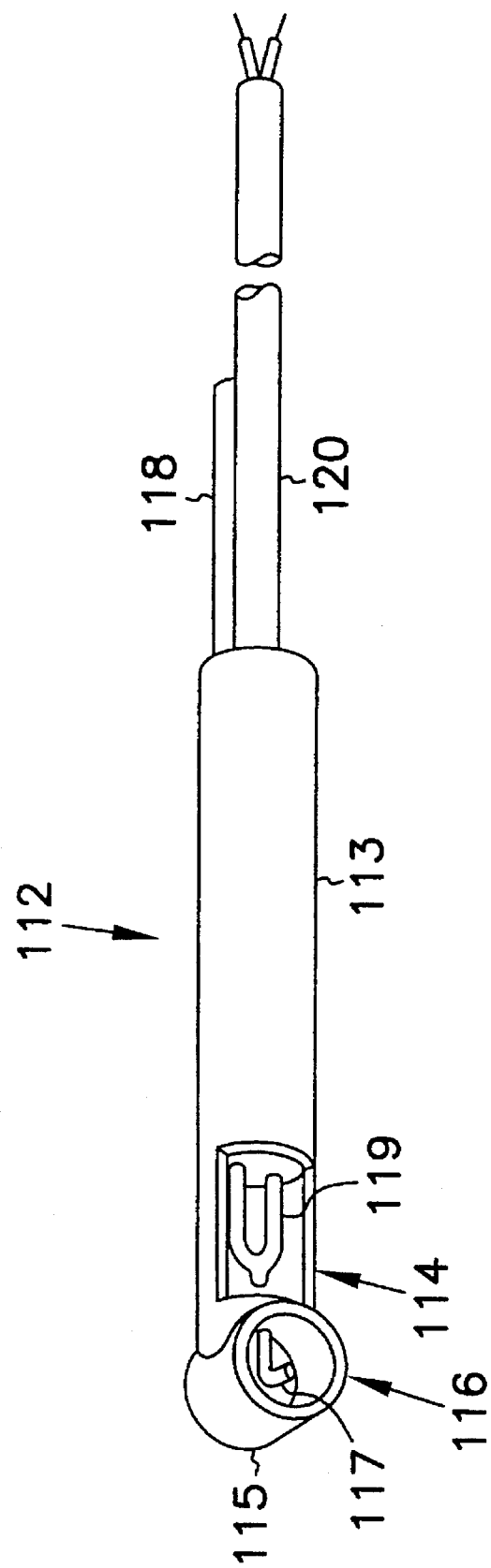
FIG. 6 is a view in perspective, at an enlarged scale, of the probe assembly shown in FIGS. 4 and 5.

As is shown in greater detail in FIG. 6, probe 112 has a stem 113 with a tip 115 in the form of a short cylindrical tube open at the front (as indicated by reference number 116) and also at the back, so that when properly oriented, the airflow to be measured flows through tip 115. Tube 117 is positioned within tip 115 and oriented to face the oncoming airflow to serve as the total pressure port for airflow measurement. This connects through internal tube 118 in stem 113, and connects through passage 110 (FIG. 5) and pressure fitting 111 for connecting the total pressure port to a transducer and the data collection system.

Also mounted on probe 112 is a thermocouple 119 which is exposed to the oncoming airflow through port on the front (reference 114) and back of the probe. Thermocouple 119 connects through conductors in cable 120 to connector 121, for connection to the data collection system.

In the use of the invention, the data system 20 is mounted in or on the aircraft, and connections are made to power, and to other systems mentioned above which may be provided as in the prior art. The standard compressor discharge air ducts of the aircraft engine are then replaced by instrumented compressor discharge air ducts, specifically instrumented ducts 80 and 81 (FIG. 2). This may be done with the engine still in the aircraft, by loosening bolts holding the back end of the engine (right-hand side of FIG. 2). Since compressor discharge air duct 80 is held in place by its ends 80a and 80b being captured by receiving flanges at duct 55 and back end of the engine, once the latter is loosened, the ducts can be removed, and the instrumented compressor discharge air duct 80 can be installed in its place. The same is true for compressor discharge air duct 81 on the other side of the engine which is also replaced with an instrumented compressor discharge air duct. The back end bolts are then tightened. After connecting static pressure fittings 107, total pressure fittings 111, and thermocouple connector 118 to transducers and electronics, connected to or provided in data box 20, the engine can be operated.

Data can then be gathered and used in calculations. Many types of data processing hardware and software may be used, such as the commonly used technique of storing all data on a recorder, then transferring data to a computer for post test analysis. However, the preferred form uses a laptop computer running a commercially available spreadsheet and receiving data from signal conditioners connected to the data transducers via Dynamic Data Exchange protocol. The system is then able to compare test data with stored specification values as the test progresses. Since the invention measures total and static pressure and temperature at the compressor output itself, and since the area of the duct is known, the mass airflow can be directly calculated. In addition, knowing the airflow, as provided by this invention, facilitates other analysis tools. These include estimating turbine nozzle flow area, and estimating turbine performance by using airflow with further thermodynamic calculations.

After the testing, the instrumented discharge air ducts 80 and 81 can be removed, and the originals replaced, by the same process described above.

It will be appreciated that because the present invention directly measures the basic parameters of mass airflow, there is no need to try to indirectly infer airflow from other parameters, as in prior art field test systems. Also, since the invention can be applied to an engine in the field without having to remove the engine from the aircraft, the invention can provide a great savings in time and money in accurately diagnosing the cause of substandard performance.

I claim:

1. A method of testing performance of a gas turbine engine which has a standard duct for conveying discharge air from a compressor of the engine, comprising the steps of:

providing an instrumented discharge air duct having sensors mounted therein for sensing static pressure, total pressure and temperature of air flowing through the duct;

removing the standard duct from the engine and replacing the standard duct by removably installing said instrumented discharge air duct;

operating the engine with said instrumented discharge air duct in place; and, collecting data from said sensors to provide a measurement of mass airflow output from the compressor of the engine during operation.

2. The method of claim 1 wherein said instrumented discharge air duct is held in place in the engine by each end of said instrumented discharge air duct being slip fit into recesses in housings or the engine, and wherein said step of removing the standard duct includes loosening a portion of the housing to free each end of the standard duct, and wherein said step of installing said instrumented duct includes retightening said portion of the housing.

3. The method of claim 1 further including calculating a mass airflow value from said collected data for the mass airflow output from the compressor during operation, and comparing said mass airflow value to established performance specifications for the engine.

4. The method of claim 2 wherein the gas turbine engine is mounted in an aircraft, and wherein said steps of removing said standard duct and installing said instrumented discharge air ducts are performed while the engine is in the aircraft.

5. A method of testing compressor performance of an aircraft gas turbine engine having a standard discharge air duct held in place between an output duct of the compressor and a housing adjacent a combustion area of the engine, without requiring removal of the engine from the aircraft, comprising the steps of:

providing an instrumented discharge air duct having sensors mounted therein for sensing static pressure, total pressure and temperature of air flowing through the duct;

partially disassembling the engine housing to free and remove the standard discharge air duct from the engine;

installing said instrumented discharge air duct in place of the standard duct, and reassembling the housing;

connecting said sensors to a data collecting system;

operating the engine; and, collecting data from said sensors to provide a measurement of mass airflow output from the compressor of the engine during operation.

6. The method of claim 5 further including analyzing said collected data to determine whether compressor mass airflow is within established performance specifications for the engine.

7. The method of claim 5 further including the step of removing said instrumented discharge air duct and reinstalling the standard duct at the completion of the test without removal of the engine from the aircraft.

8. An apparatus for performance testing of a gas turbine engine which has a standard duct for conveying discharge air from a compressor of the engine, comprising:

an instrumented discharge air duct which is configured substantially similar in form and function to the standard duct of the engine, for removably replacing the original duct during a testing operation;

said instrumented discharge air duct having sensors mounted therein for sensing static pressure, total pressure and temperature of air flowing through the duct; and a data collection system connected to said sensors for collecting data of static pressure, total pressure and air temperature as an indication of mass airflow output from the compressor of the engine.

9. The apparatus according to claim 8 wherein said data collection system includes means for calculating mass airflow from said collected data, for comparison with established performance specifications for the engine.

* * * * *

UNITED STATES PATENT AND TRADEMARK OFFICE
CERTIFICATE OF CORRECTION

PATENT NO. : 5,517,852
DATED : May 21, 1996
INVENTOR(S) : Raymond O. Woodason et al.

It is certified that error appears in the above-identified patent and that said Letters Patent is hereby corrected as shown below:

Column 5, line 24, delete "or the engine" and insert therefor --of the engine--.

Signed and Sealed this

Sixth Day of May, 1997

*Attest:*

BRUCE LEHMAN

*Attesting Officer*   *Commissioner of Patents and Trademarks*